G. THURMES.
DEVICE FOR REMOVING WHEELS FROM SHAFTS.
APPLICATION FILED JUNE 1, 1917.
1,254,377.
Patented Jan. 22, 1918.
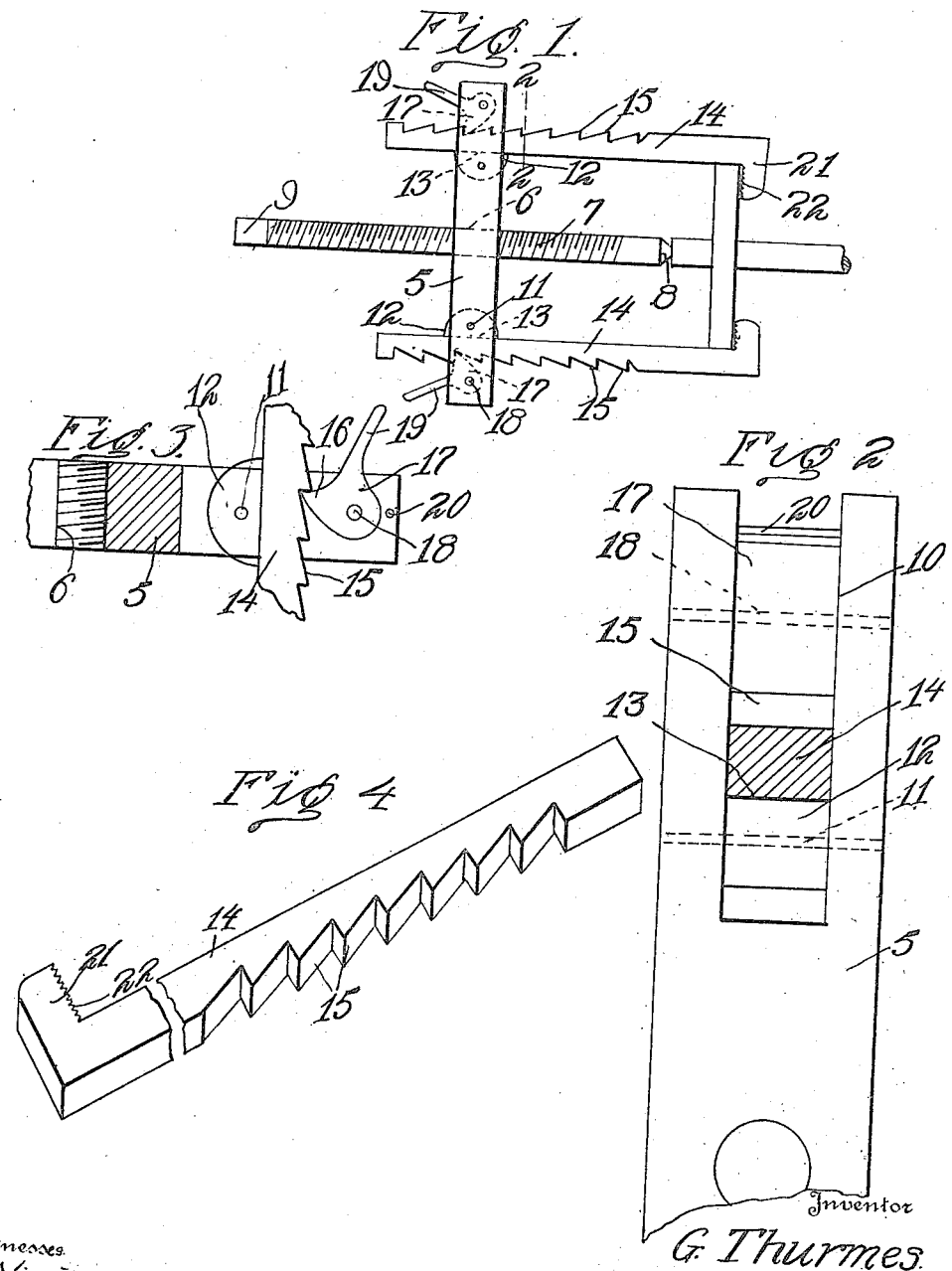
Witnesses
Inventor
G. Thurmes
By
Attorneys

UNITED STATES PATENT OFFICE.

GEORGE THURMES, OF HAMPTON, MINNESOTA.

DEVICE FOR REMOVING WHEELS FROM SHAFTS.

1,254,377.  Specification of Letters Patent.  Patented Jan. 22, 1918.

Application filed June 1, 1917. Serial No. 172,186.

*To all whom it may concern:*

Be it known that I, GEORGE THURMES, a citizen of the United States, residing at Hampton, in the county of Dakota, State of Minnesota, have invented certain new and useful Improvements in Devices for Removing Wheels from Shafts; and I do hereby declare the following to be a full, clear, and exact description of the invention, such as will enable others skilled in the art to which it appertains to make and use the same.

This invention is an improvement in tools primarily designed for removing wheels and gears from shafts and has particular reference to the mounting for the grapple arms of the tool.

An object of the invention is to provide a follower member having an improved mounting for the grapple arms which will permit of an easy and quick adjustment thereof both pivotally and transversely with respect to said follower member.

Another object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a plan view of the tool constructed in accordance with the invention.

Fig. 2 is a section on the line 2—2 of Fig. 1.

Fig. 3 is a fragmentary longitudinal section taken through one of the grapple arms.

Fig. 4 is a perspective view of one of the grapple arms.

The invention is illustrated in what is now believed to be its preferred form and comprises a follower member 5 in the form of a rectangular bar having a central screw threaded opening 6 for receiving the screw member 7 having a point 8 at one end to engage the end of a shaft carrying the wheel or gear to be removed and a head 9 at its other end for engagement by a wrench whereby said screw member may be rotated.

Each end of the follower member 5 is preferably provided with a bifurcation 10 having a pivot pin 11 extending transversely of the inner end thereof and upon which is pivotally mounted the bearing element 12 preferably in the form of a semi-circular block having a flat surface 13 against which the adjacent edge of a grapple arm 14 is adapted to bear. The opposite longitudinal edge of each grapple arm 14 is provided with rack teeth 15 any one of which is adapted to be engaged by the locking end 16 of a supporting member 17 mounted upon the pivot 18 also extending transversely of the bifurcation 10 adjacent the outer end thereof. The member 17 is preferably provided with a finger piece or handle 19 the movement of which in one direction is limited by the stop pin 20 mounted in the sides of the bifurcation 10 at the outer end thereof. Each grapple arm 14 is further provided with a head 21 having a serrated or toothed face 22 adapted to engage the surface of a wheel or gear.

From the foregoing description it will be apparent that the grapple arms 14 are adjustably mounted both pivotally and transversely with respect to the follower 5 and owing to the fact that the same are in no way connected to said follower they may be readily and quickly removed and replaced. The arms 14 are pivotally mounted and supported by the bearing block 12 so that the heads 21 thereof may be adjusted to engage wheels and gears of different diameters and in order to adjust an arm transversely of the follower the finger piece 19 of the supporting member 17 need only be swung to disengage the locking end 16 from the teeth 15 whereupon the arm 14 may be adjusted as desired, after which the locking end 16 is again engaged with one of the teeth 15 so that the arm will be again supported in adjusted position. It will further be apparent that when the screw member 7 is adjusted during the operation of removing a wheel or gear the bearing blocks 12 and supporting members 17 will wedge the grapple arms 14 therebetween and the wedging action will be proportionately increased to the pull upon said arms in the direction of the heads thereof.

What is claimed is:—

1. A tool of the class described comprising a follower member, an adjusting screw mounted therein, grapple arms held in pivotal and slidable contact with said follower member, bearing elements pivoted to said follower member and engaging said grapple arms to permit of a pivotal adjustment thereof, and supporting members pivotally connected to said follower member and engaging said grapple arms to prevent sliding movement thereof in one direction.

2. A tool of the class described comprising a follower member, an adjusting screw mounted therein, grapple arms held in pivotal and slidable contact with said follower member, bearing elements pivoted to said follower member and engaging said grapple arms to permit of a pivotal adjustment thereof, and supporting members pivotally connected to said follower member and engaging said grapple arms to prevent sliding movement thereof in one direction, said bearing elements and supporting members combining to wedge said grapple arms therebetween when a pull is exerted on said arms in one direction.

3. A tool of the class described, comprising a follower member having bifurcations at each end thereof, an adjusting screw mounted in said follower member, a semicircular bearing block pivotally mounted in the inner end of each bifurcation, a supporting member pivotally mounted adjacent the outer end of each bifurcation and having a locking end, and a grapple arm interposed between said bearing element and said supporting member and extending transversely of said follower member, said grapple arm having rack teeth upon one edge thereof adapted to be engaged by said locking end of the supporting member whereby to prevent movement of said arm in one direction, the other edge of said arm engaging the flat surface of said bearing element whereby said arm may be pivotally adjusted relative to said follower member.

In testimony whereof, I affix my signature in the presence of two witnesses.

GEORGE THURMES.

Witnesses:
HENRY THURMES,
PETER THURMES.

Copies of this patent may be obtained for five cents each, by addressing the "Commissioner of Patents, Washington, D. C."